United States Patent [19]
Brille et al.

[11] 3,727,399
[45] Apr. 17, 1973

[54] ROTARY-PISTON DIESEL ENGINE SUPERCHARGERS

[75] Inventors: Maurice Brille; Yves Baguelin, both of Suresnes, France

[73] Assignee: Societe Anonyme de Vehicules Industriels et D'Equipments Mecaniques Saviem, Suresnes, Hauts de Seine, France

[22] Filed: Mar. 8, 1971

[21] Appl. No.: 121,751

[52] U.S. Cl. ............60/13, 123/119 CB, 123/119 CE
[51] Int. Cl. .............................................F02b 37/04
[58] Field of Search ..................60/13; 123/119 CB; 418/54

[56] References Cited

UNITED STATES PATENTS

| | | | |
|---|---|---|---|
| 3,595,013 | 7/1971 | Brille et al. | 60/13 |
| 3,483,854 | 12/1969 | Foran et al. | 60/13 |
| 3,405,692 | 10/1968 | Paschke | 60/13 |
| 3,358,439 | 12/1967 | De Coye De Castret | 60/13 |
| 3,142,957 | 8/1964 | Roesling | 60/13 |
| 2,877,622 | 3/1959 | Antonissen | 60/13 |
| 2,845,774 | 8/1958 | Bertin | 60/13 |
| 3,141,293 | 7/1964 | Crooks | 60/13 |
| 3,355,879 | 12/1967 | Smith et al. | 123/119 CB |
| 1,636,486 | 7/1927 | Planche | 418/54 |

Primary Examiner—Carlton R. Croyle
Assistant Examiner—Warren Olsen
Attorney—Stevens, Davis, Miller & Mosher

[57] ABSTRACT

In a supercharging system for Diesel rotary-piston engines comprising a turbosupercharger and a volumetric supercharger, means are provided for drawing air downstream of the volumetric supercharger and utilizing this tapped air in an air pump also receiving the air having passed through the engine radiator, a needle valve responsive to the supercharging pressure controlling the delivery of drawn air into the neck of a convergent divergent section of said pump, this drawn air being also adapted to be injected into the exhaust pipe of the turbine of said turbosupercharger which receives the exhaust gas from the engine, said exhaust pipe being connected in turn to the interior of another pump mounted in the radiator cooling air duct, a needle valve being inserted in the pipe delivering the air derived downstream of said volumetric supercharger, in order to improve the efficiency of the system by reducing the counter-pressure upstream of the exhaust turbine while improving the drawn air output and therefore the air-pump throughput and the engine radiator cooling air output, said needle valve being responsive to this end to a spring-loaded bellows responsive in turn to the supercharging pressure.

13 Claims, 5 Drawing Figures

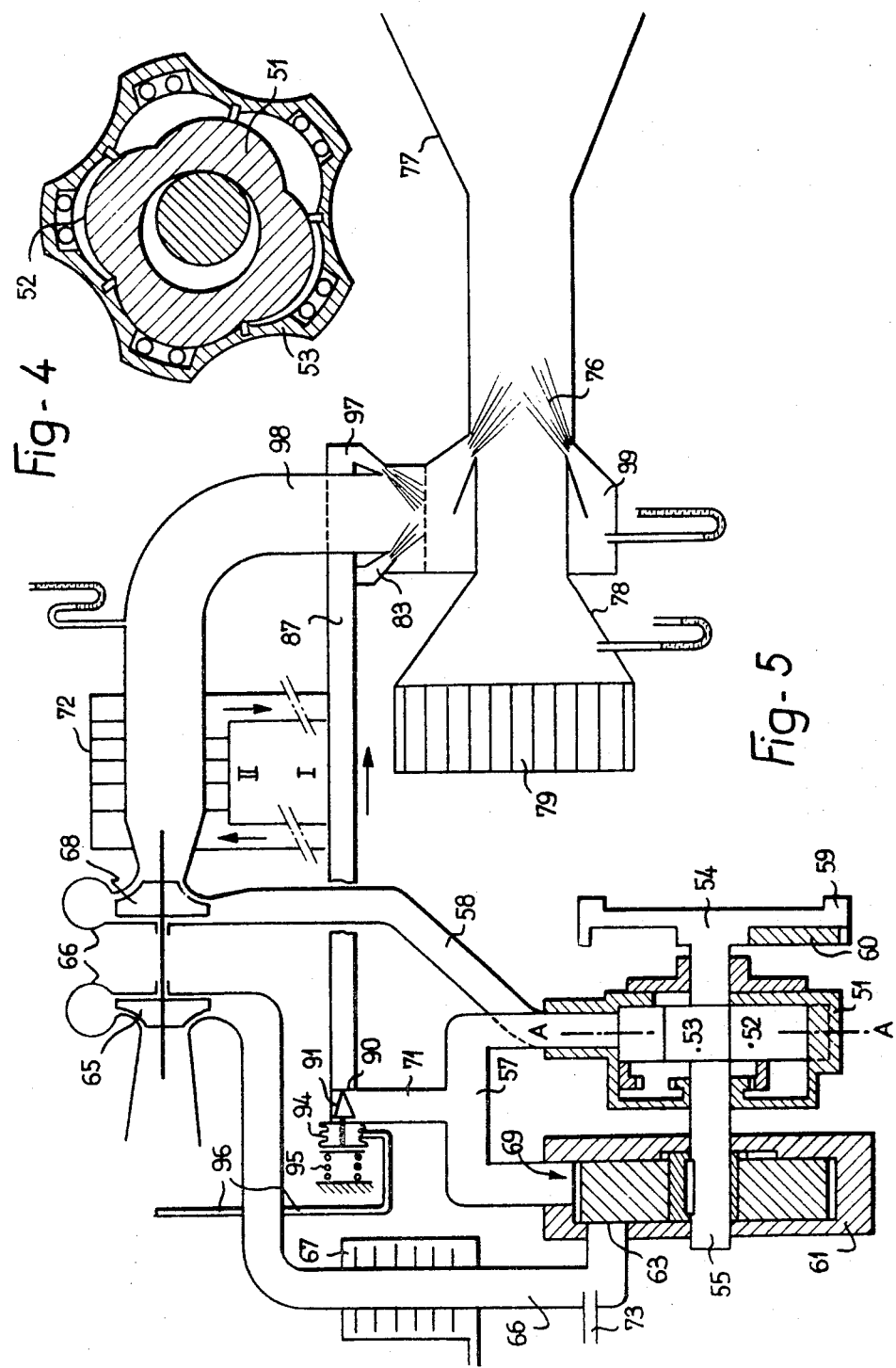

ROTARY-PISTON DIESEL ENGINE SUPERCHARGERS

This invention relates in general to supercharging systems of rotary-piston Diesel or compression-ignition engines, and has specific reference to improvements in or relating to supercharging systems of this character.

In a prior U.S. Pat. application, Ser. No. 794.187 of Jan. 27, 1969, now U.S. Pat. No. 3,595,013 the applicants disclosed an arrangement for the compensated supercharging of a conventional Diesel or compression-ignition engine in which the possibilities of high overpressure available through the use of a turbosupercharger were combined with the low-speed efficiency of a volumetric supercharger mounted in series with said turbosupercharger by providing a variable speed ratio between the engine and the volumetric supercharger.

On the other hand, it is known that so-called rotary or rotary-piston engines are difficult to operate according to the Diesel cycle since they can hardly admit a high compression ratio, due to the considerable residual dead angle resulting from their particular kinematics. Beyond a 10:1 compression ratio these rotary piston engines have excessive over-all dimensions and a low mechanical efficiency.

It is the essential object of the present invention to avoid the inconveniences set forth hereinabove and to permit the operation according to the Diesel cycle of rotary piston engines having a low volumetric or compression ratio, say, of the order of 8:1.

To this end, the improvements according to this invention comprise the use of a turbosupercharger driven from the engine exhaust gas, an air/water heat exchanger and a volumetric supercharger mounted in series with said turbosupercharger, the volumetric supercharger being driven at a speed proportional to the engine speed, one fraction of the supercharging air being drawn or diverted from the fluid connection between the volumetric supercharger and the engine in order to modify the supercharging pressure as a function of the engine speed and load.

However, to perform a two-stage supercharging the aforesaid volumetric supercharger must be capable of compressing fluids up to ratios of the order of 3:1, or even 4:1. Under these conditions it is not possible to use as a volumetric supercharger the Rootes type supercharger with external gear which, due to its poor adiabatic fluid compression efficiency, cannot reasonably exceed compression ratio values of the order of 2:1 without a considerable loss of efficiency. In the present instance, the volumetric supercharger to be used preferably will be that of the internal gear type such as the Planche supercharger as shown in U.S. Pat. No. 1,636,486 adapted to effect an adiabatic compression and provide under satisfactory efficiency conditions the desired ratios of the order of 3:1 to 4:1.

This twin-rotor volumetric supercharger will preferably be so arranged that one of its two rotors, namely the slowest one, is mounted directly to the rotary-engine crankshaft, the other rotor revolving for example at a speed corresponding to twice or one-and-half that of the first rotor. The slow, crankshaft-driven rotor will be used as one of the engine rotor balancing members, the other balancing member consisting of a flywheel disposed on the other side of the engine.

As this supercharger operates with a maximum ratio of about 4:1, it will admit a relatively considerable dead angle.

Of course, this invention is also concerned with the arrangements already disclosed and suggested in the above-mentioned patents and patent applications, notably the fumigation circuit, the heat-exchanger connected to the exhaust, and the variable-section choke or tube of the air pump, the variable cross-sectional passage area of said choke or tube being adjusted by means of a bellows responsive to the supercharging pressure of the turbosupercharger.

According to a first preferred form of embodiment of the present invention the air drawn from a point located downstream of the volumetric supercharger is utilized in an air pump adapted to convey the air having passed through the water-cooling engine radiator, this air penetrating into this pump through a nozzle disposed at the level of a convergent-divergent passage or neck of said pump.

According to a second form of embodiment, the air drawn from said point downstream of the volumetric supercharger is injected into the exhaust manifold of the turbine of the turbosupercharger which receives the engine exhaust gas, said manifold delivering in turn its fluid stream into a pump inserted in the air flow for cooling the radiator.

Still according to this second form of embodiment, a needle-valve output adjustment device is also inserted in the air-tapping duct. Thus, the efficiency of the device is improved as a consequence of the resulting reduction of the counter-pressure produced upstream of the exhaust turbine, while improving the tapping of supercharging air, and therefore producing an increment in the pump output and in the throughput of cooling air directed through the engine radiator.

This tapped or drawn air may be injected directly into the exhaust manifold or be preheated through a heat exchanger connected to this manifold. This air is introduced into the manifold either through a central injection nozzle or through an annular injection nozzle.

The performance of this arrangement may be improved as well as that of the complete power unit by utilizing, as an alternative to the aforesaid gear supercharger of the Planche type, a supercharger, comprising rotary pistons with n peripheral lobes having an epicyclic shape and revolving in a stator having a conjugate contour and $n+1$ lobes With superchargers of this character a considerable and regular air output under very high pressures may be obtained, due to the absence of any dead angle. They are perfectly adapted to the rates of operation of rotary engines having a trochoidal rotor with which they constitutes an advantageous combination when the operation of these engines according to the Diesel cycle is contemplated.

This arrangement constitutes an advantageous combination of several factors ensuring a substantial improvement in the final output:

the supercharging air output and pressure are increased, the counter-pressure ahead of the turbine is reduced due to the cooling of the gas by the tapping air, and the gas is accelerated by the pump effect of this drawn air, the radiator cooling air circulation rate is increased due to the increased induction effect resulting from the addition of the turbine exhaust flow, this exhaust flow is diluted and cooled considerably before being vented to the free atmosphere, the turbine exhaust noise is damped out.

Other features and advantages of this invention will appear as the following description proceeds with reference to the attached drawings illustrating diagrammatically by way of example two typical forms of embodiment of the invention. In the drawings:

FIG. 4 is a diagrammatic sectional view showing a lobe-type rotary volumetric supercharger, and FIG. 5 is another general diagram showing a modified arrangement in which the drawn air is injected into the exhaust manifold by means of an induction pump comprising an annular injector or nozzle.

Figure 1:
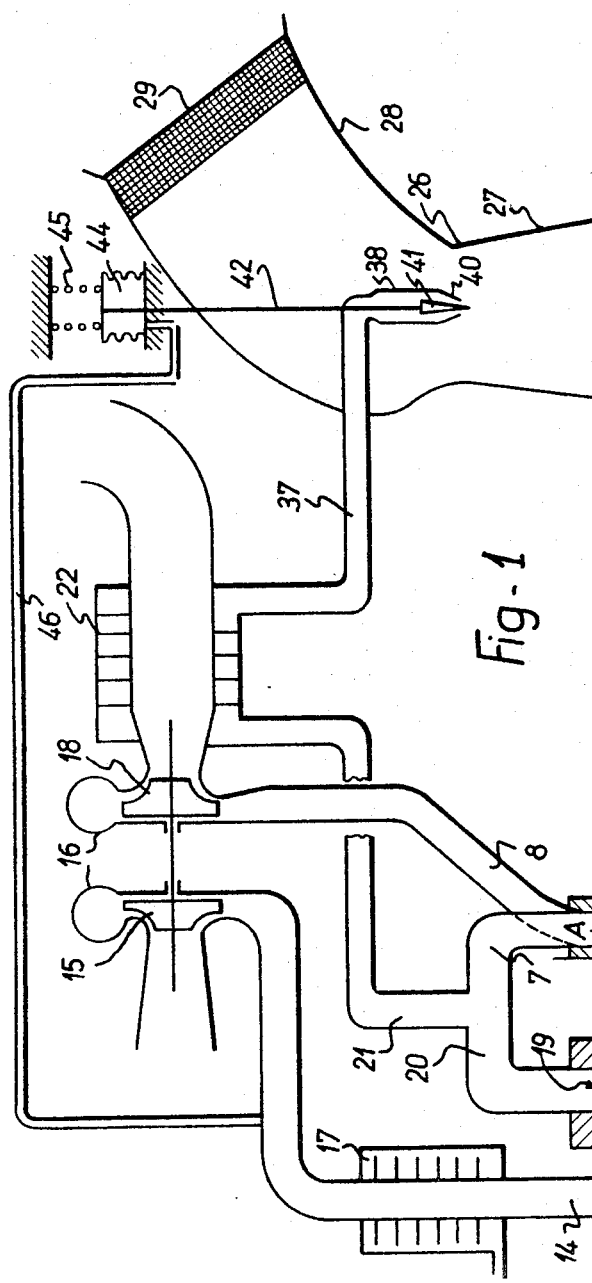
FIG. 1 is the general diagram of the arrangement according to this invention.

Referring first to FIG. 1, this diagram shows a rotary-piston Diesel engine comprising a stator 1, a rotor 2 and a crankshaft 3 having right-hand and left-hand ends denoted 4 and 5, respectively. The rotary engine fuel injector is shown diagrammatically at 6, as well as its induction pipe 7 and exhaust pipe 8. At the right-hand end of crankshaft 3 the latter carries a flywheel 9 having a counterweight 10. The left-hand end of crankshaft 3 carries the slow rotor 11 of a volumetric supercharger 11', this rotor 11 being provided with a balance weight 12; the other rotor or fast rotor is not visible in FIG. 1; the induction ports 13 of the supercharger are connected to a pipe 14 connecting the centrifugal blower 15 of a turbosupercharger 16 to this volumetric supercharger, as shown. The pipe 14 extends through an air/water heat exchanger 17 adapted to cool or heat, according to the momentary conditions of operation, the induction air from the engine cooling water. The exhaust pipe 8 delivers the exhaust gas from the engine to the turbine proper 18 of turbosupercharger 16. Connected to the delivery port 19 of volumetric supercharger 11 is a single pipe 20 co-extensive with the rotary engine induction pipe 7.

Branched off this pipe 20 is a tapping pipe 21 directing the excess compressed air into an air/gas exchanger 22, then via a pipe 37 to an injection nozzle 38; this nozzle 38 opens into the neck 26 of an air pump comprising a divergent 27 and a convergent 28, the latter surrounding the engine radiator 29 with the assistance of a suitable sheath. The nozzle orifice 40 has a variable cross-sectional passage area adapted to be adjusted as a function of the axial position of a needle valve 41. This needle valve 41 is controlled by a rod 42 from a bellows 44 responsive to a return spring 45; the inner space of this bellows 44 communicates via a pipe 46 with the outlet of the centrifugal blower 15 and is therefore constantly kept at the supercharging pressure.

It will be noted that to a compression ratio of, say, 8:1 there corresponds a similar expansion ratio in the rotary Diesel engine; the exhaust gas pressures, when the exhaust port 8 is opened, will be higher than in a conventional Diesel piston engine. Apparently, it would be desirable to protract this expansion by using volumetric means. In fact, it is well known in the art that it is not advantageous to extend the expansion time through volumetric means below a certain limit pressure. Now the arrangement illustrated lies substantially at this pressure limit; to obtain a satisfactory efficiency, it is only necessary that the turbine 18 be designed accordingly, i.e., with a view to derive the best possible efficiency from the exhaust pressure values. In other words, the turbine is designated to have the best efficiency to change the pressure of the exhaust gas into power.

Of course, the fumigation systems described in the above-mentioned applicants' patents and opening into the inlet of the volumetric supercharger are applicable to the present instance, these various circuits opening at 23 into the duct 14, upstream of the inlet port 13 of the volumetric supercharger.

The above-described arrangement operates as follows:

Under low power output conditions the pressure created in pipe 14 by the centrifugal blower 15 is relatively low. On the other hand, the volumetric supercharger 11 increases this pressure considerably in the induction and tapping pipes 7 and 21, respectively. However, the outlet of tapping pipe 21 is closed by needle valve 41. The low pressure prevailing in pipe 46 is not sufficient to overcome the force exerted by spring 45 on the bellows 44, rod 42 and needle valve 41. Under these conditions all the supercharging power likely to be developed by the turbosupercharger 16 and volumetric supercharger 11 is preserved and applied to the engine 1, i.e. when this power is really needed by the engine.

When the engine 1 operates at a high power rating the turbosupercharger 16 delivers a high pressure to pipe 14. The volumetric supercharger would tend to further increase this pressure but beyond a predetermined pressure built up downstream of the centrifugal blower 15 and therefore in the bellows 44 connected thereto the spring 45 will yield and thus needle valve 41 will be pulled upwards to open the orifice of nozzle 38. Thus, the outputs of turbosupercharger 16 and volumetric supercharger 11 are directed at the same time into the induction pipe 7 of engine 1 and into the tapping pipe 21, the latter thus drawing compressed air at a rate increasing with the engine power output.

The ratio of the volume generated by the volumetric supercharger to the volume generated by the engine is no more an expression of the engine supercharging and this ratio may become proportionaly very low. This result is generally desirable and was actually obtained with the variable control disclosed in the aforesaid U.S. Pat. application, Ser. No. 794.187 of Jan. 27, 1969.

It may be noted that the combination of the air pump with the heat exchanger 17 constitutes a kind of automatic regulator. In fact, in case of insufficient pump operation the temperature of the cooling water will increase in radiator 29 and heat exchanger 17. Under these conditions, this exchanger 17 will transfer more heat energy to the induction air of the pump; the pump output is thus increased and the cooling action improved accordingly.

The air/gas exchanger 22 will heat the induction air by means of the exhaust gas. As a result, the induction power available across the nozzle 38 is increased.

According to another form of embodiment of this invention the air drawn between the volumetric supercharger and the engine is injected into the turbine delivery duct, i.e. downstream of the turbosupercharger.

Figure 2:
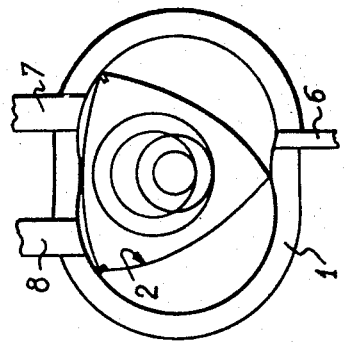
FIG. 2 is a diagrammatic sectional view of the rotary piston engine, the section being taken along the line A—A of FIG. 1.
Figure 3:
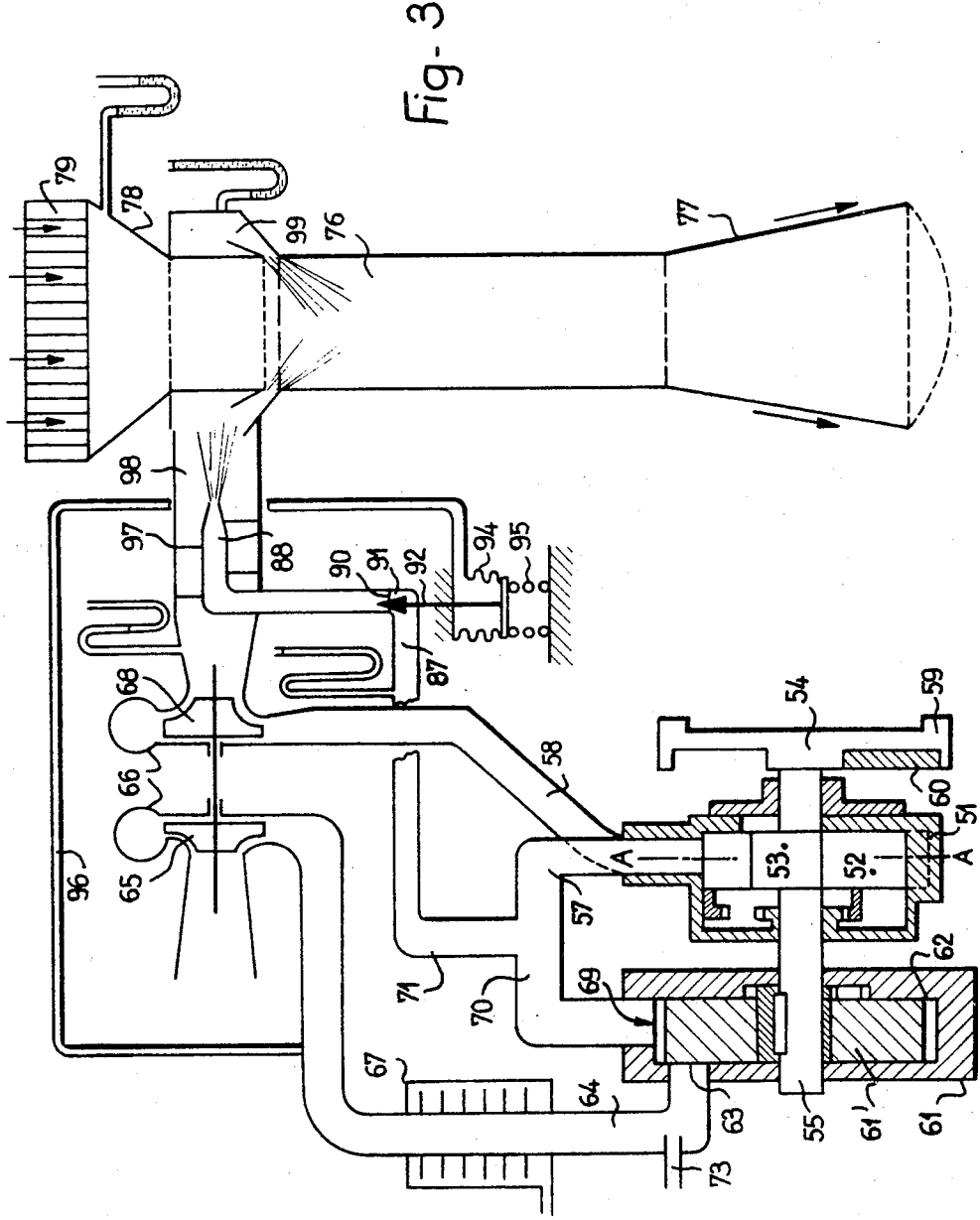
FIG. 3 is a general diagram of the arrangement comprising means for injecting tapped air by means of a central injector downstream of the turbine.

FIG. 3 illustrates a rotary-piston Diesel engine comprising a stator 51, a rotor 52 and a crankshaft 53 having right-hand and left-hand ends designated by the reference numerals 54 and 55 respectively. The rotary engine fuel injector is shown at 6 in FIG. 2 ; the induction pipe 57 and exhaust pipe 58 have the same relative arrangement as shown diagrammatically in FIG. 2. The right-hand end 54 of crankshaft 53 carries a flywheel 59 having a balance or counter weight 60. The left-hand end 55 of crankshaft 53 carries the rotor 61' of a volumetric supercharger 61, this slow rotor 61' carrying a balance weight 62 ; the inlet ports of this supercharger are connected to a pipe 64 extending from the centrifugal blower 65 of a turbosupercharger 66. The pipe 64 extends through an air/water heat exchanger 67 adapted to cool or heat, according to operating conditions, the induction air from the engine cooling water. The exhaust pipe 58 delivers the exhaust gas to the turbine 68 of turbosupercharger 66. The delivery port 69 of the volumetric supercharger 61 is connected to a single pipe 70 connected in turn to the induction pipe 57 of the rotary engine 51 ; branched off this pipe 70, 57 is a tapping or drawing pipe 71 directing the excess compressed air firstly through an air/gas exchanger 72 (FIG. 5), then via another pipe 87 to a nozzle 83 of an air pump 97 opening into the exhaust pipe 98 downstream of the turbine 68. This exhaust pipe is connected in turn to the annular injector surrounding the neck 76 of an air pump 99, between a divergent 77 and a convergent 78, the latter surrounding in turn the engine cooling radiator 79 by means of a suitable sheath or duct.

The volumetric supercharger 61 may be for example of the rotary piston type (FIG. 4), i.e. comprising rotary pistons 41 with n peripheral lobes 52 having an epicyclic shape and revolving in a stator 53 having a conjugate contour and n+1 lobes.

The induction air input is adapted to vary according to the position of needle valve 91. The shape of this needle valve 91 may be either tapered or have a contour comprising a curvilinear generatrix. This needle valve 91 responsive through a rod 92 to a bellows 94 is normally urged to its closed position by a spring 95 ; the inner space of bellows 94 communicates via a pipe 96 with the delivery pipe of centrifugal blower 65 and is therefore responsive to the supercharging pressure (FIG. 3).

The above-described modified arrangement operates as follows :

Under low engine power rating conditions the pressure created in pipe 64 by the centrifugal blower 65 is relatively low. On the other hand, this pressure is increased considerably by the volumetric supercharger 61 in the induction and tapping pipes 57 and 71. However, the outlet of tapping pipe 71 is closed by the needle valve 91. The moderate pressure prevailing in pipe 96 is not sufficient to overcome the force exerted by spring 95 on the bellows 94, rod 92 and needle valve 91. Therefore all the supercharging air delivered by the turbosupercharger 66 and volumetric supercharger 61 is preserved and applied to the engine 51, i.e. when this supply is most needed by the engine.

When the engine 51 operates at a high-power rating (see also the form of embodiment illustrated in FIG. 5) the turbosupercharger 66 delivers high pressure air into pipe 64. The volumetric supercharger 61 would tend to further increase this pressure ; however, beyond a predetermined threshold of the pressure prevailing downstream of the centrifugal blower 65 and therefore in the bellows 94, the spring 95 yields and the needle valve 91 is retracted (FIG. 3) or moved to the left (FIG. 5), thus opening the orifice 90 of nozzle 83. The turbosupercharger 66 and volumetric supercharger 61 will thus deliver compressed air both into the induction pipe 57 of engine 51 and into the drawing pipe 71, the amount of air drawn through this pipe 71 increasing with the engine power output.

This air possibly after having been preheated in the heat exchanger 72 (FIG. 5), is injected by the nozzle 83 of an air pump 97 into the pipe 98 so as to accelerate therein the exhaust gas flow by a double thermal and kinetic action. The thus accelerated flow is directed into the annular inductor of the second air pump 99 of an annular peripheric type having a cross-sectional area sufficient to avoid the development of any counter-pressure, so as to induce therein an air flow for cooling the radiator 79 as in the case illustrated in FIG. 3, but with a considerably higher output.

It should be noted that the combined use of air pumps and a heat exchanger 67 provides an automatic regulation. In fact, in case of insufficient pump operation the temperature of the cooling water will increase in radiator 79 and heat exchanger 67. This exchanger 67 then transfers more heat energy to the pump induction air, thus increasing the pump input, and the cooling action is improved accordingly.

Of course, this invention should not be construed as being strictly limited to the specific forms of embodiment shown and described herein since various modifications and variations may be brought thereto, as will readily occur to those conversant with the art, without inasmuch departing from the basic principles of the invention as set forth in the appended claims.

What is claimed as new is :

1. An improved control system for a supercharged rotary piston diesel engine comprising:
    a turbosupercharger driven by the engine exhaust gas having an output air discharge and having an exhaust pipe to remove the exhaust gas from the engine;
    a twin-rotor volumetric supercharger driven at a speed proportional to the engine speed;
    a conduit connecting the output air discharge from said turbosupercharger to said volumetric supercharger;
    an air-liquid heat exchanger in said conduit;
    means for circulating an engine cooling liquid through said heat exchanger and to a radiator;
    an outlet pipe conducting the supercharged air from the volumetric supercharger to the engine;
    a tapping pipe connected to said outlet pipe whereby a part of the supercharged air may be discharged; and means responsive to the pressure in said conduit from the turbosupercharger to control the discharge from said tapping pipe.

2. A system according to claim 1 wherein said volumetric supercharger is of the internal-geared Planche type.

3. A system according to claim 2 wherein the slow rotor of the volumetric supercharger is carried by the shaft of the rotary piston of the engine and acts as a balancing weight to this rotary piston.

4. A system according to claim 1 wherein the supercharged air which is withdrawn through the tapping pipe is delivered to an air pump for cooling the radiator.

5. A system according to claim 4 wherein an air-gas heat exchanger is added to the exhaust pipe from the turbosupercharger to provide additional heat to the air in the tapping pipe being supplied to said air pump.

6. A system according to claim 1 wherein said tapping pipe is connected to the exhaust pipe of the turbosupercharger and means are provided for injecting the air in the tapping pipe into the exhaust pipe of said turbosupercharger whereby a first pump is formed.

7. A system according to claim 6 wherein the exhaust gas from the turbosupercharger is directed into a second induction pump.

8. A system according to claim 7 wherein said radiator is disposed upstream of a convergent section and of a neck surrounding said second pump which is supplied from a first pump via said exhaust pipe, said neck being followed by a divergent section in order to increase the cooling of said radiator.

9. A system according to claim 6 wherein an adjustable orifice is provided in the tapping pipe leading to said first pump for controlling the amount of air drawn therefrom.

10. A system according to claim 9 wherein said adjustable orifice comprises a needle valve having a tapered shape or a contour having a curvilinear generatrix is provided, said needle valve rigid with a rod being urged by a return spring to its seated position and responsive to a bellows connected to the conduit from said turbosupercharger such that the air pressure from the turbosupercharger is applied.

11. A system according to claim 6 wherein an air-gas heat exchanger is inserted in the exhaust pipe from the turbosupercharger in order to heat the air in the tapping pipe which is then connected to said first air pump.

12. A system according to claim 7 wherein at least the nozzles of said second pump are of the annular peripheric type.

13. A system according to claim 6 wherein said volumetric supercharger is of the rotary piston type with the rotary piston having n peripheral lobes of epicyclic contour revolving in a stator of conjugate contour comprising $n + 1$ lobes.

* * * * *